(12) United States Patent
Chen et al.

(10) Patent No.: US 10,596,498 B2
(45) Date of Patent: Mar. 24, 2020

(54) ACTIVE COALESCER TO REMOVE FINE LIQUID DROPLETS

(71) Applicant: UOP LLC, Des Plaines, IL (US)

(72) Inventors: Pengfei Chen, Glenview, IL (US); Zhanping Xu, Inverness, IL (US); Xiaoming Wen, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 712 days.

(21) Appl. No.: 14/700,919

(22) Filed: Apr. 30, 2015

(65) Prior Publication Data
US 2016/0317960 A1    Nov. 3, 2016

(51) Int. Cl.
*B01D 39/12*   (2006.01)
*B01D 17/04*   (2006.01)

(52) U.S. Cl.
CPC ........... *B01D 39/12* (2013.01); *B01D 17/045* (2013.01)

(58) Field of Classification Search
None
See application file for complete search history.

(56) References Cited

U.S. PATENT DOCUMENTS

| | | |
|---|---|---|
| 4,326,581 A | 4/1982 | Rapier |
| 4,964,898 A | 10/1990 | Toda |
| 5,122,169 A | 6/1992 | Schumacher et al. |
| 5,362,446 A | 11/1994 | Schatz |
| 6,149,408 A | 11/2000 | Holt |
| 7,032,410 B2 | 4/2006 | Barratt et al. |
| 7,413,657 B1 * | 8/2008 | Thundyil ............ B01D 11/0492 210/634 |
| 7,955,999 B2 * | 6/2011 | Luo ........................ B01J 8/0453 502/150 |
| 8,067,656 B2 | 11/2011 | Luo et al. |
| 8,088,338 B2 * | 1/2012 | Luo ........................ B01J 8/0453 210/634 |
| 8,114,183 B2 * | 2/2012 | Schwandt ............ B01D 17/045 55/498 |

(Continued)

FOREIGN PATENT DOCUMENTS

| | | |
|---|---|---|
| EA | 201190345 A1 | 6/2012 |
| EP | 2 463 008 A1 | 6/2012 |

(Continued)

OTHER PUBLICATIONS

International Search Report dated Sep. 8, 2016 in International Application No. PCT/US2016/028273.

(Continued)

*Primary Examiner* — Robert J Popovics

(57) ABSTRACT

Separation processes and separation apparatus are described. The process includes introducing a stream of liquid containing dispersed droplets of another liquid into a separation apparatus comprising a vessel having at least one mesh screen covering substantially all of the cross-section of the vessel. The mesh screen is periodically slightly moved so that the wires of the mesh screen contact the dispersed droplets and some of the dispersed droplets coalesce on the wires. The coalesced droplets rise or fall from the wires through the stream of the second liquid. The coalesced droplets are collected in a portion of the vessel. A stream of the second liquid having a reduced level of dispersed droplets is recovered.

20 Claims, 2 Drawing Sheets

(56) References Cited

U.S. PATENT DOCUMENTS

| | | | |
|---|---|---|---|
| 8,545,707 B2* | 10/2013 | Rego | B01D 17/045 210/800 |
| 8,906,311 B2 | 12/2014 | Timken et al. | |
| 9,168,475 B2* | 10/2015 | Dorao | B01D 45/14 |
| 2007/0062886 A1* | 3/2007 | Rego | B01D 17/045 210/799 |
| 2007/0062887 A1* | 3/2007 | Schwandt | B01D 17/045 210/799 |
| 2009/0170687 A1* | 7/2009 | Luo | B01J 8/0453 502/22 |
| 2010/0172806 A1* | 7/2010 | Luo | B01J 8/0453 422/140 |
| 2010/0278699 A1* | 11/2010 | Luo | B01J 8/0453 422/140 |
| 2010/0326922 A1 | 12/2010 | Varanasi et al. | |
| 2012/0151887 A1* | 6/2012 | Dorao | B01D 45/14 55/437 |
| 2013/0066133 A1 | 3/2013 | Cleverdon et al. | |
| 2013/0276416 A1 | 10/2013 | Schook | |
| 2014/0018598 A1 | 1/2014 | Pfeiffer et al. | |
| 2014/0034580 A1 | 2/2014 | Chen | |
| 2014/0326683 A1 | 11/2014 | Kathan et al. | |
| 2016/0317960 A1* | 11/2016 | Chen | B01D 39/12 |

FOREIGN PATENT DOCUMENTS

| | | | | |
|---|---|---|---|---|
| GB | 1064065 A | 4/1967 | | |
| NL | 198500001 A | 8/1986 | | |
| RU | 2105584 C1 | 2/1998 | | |
| SU | 1292843 A1 | 2/1987 | | |
| WO | WO-2016176084 A1 * | 11/2016 | | B01D 39/12 |

OTHER PUBLICATIONS

Wang et al., "Analysis of liquid-desiccant dehumidifying system combined . . . ," Journal of Central South University (Science and Technology)(2011), 42(1), 240-246.

Boam et al., "Finest Drop Coalescer Elements Promote Product Recovery," Filtration & Separation (2003), 22-25.

Wilcock et al., "A Stochastic Design Procedure to Describe the Structure and Performance of Knitted Wire . . . ," IChemE Research Event/First European Conference (1995), 173-175.

Feord et al., "A Stochastic Model to Describe the Operation of Knitted Mesh Mist Eliminators, Computation . . . ," Trans I ChemE (1993), vol. 71, Part A, 282-294.

Belden, Ronald D., "Mist Eliminators in Evaporators and Pans," Sugar Industry Techologists Meeting, Savannah, Georgia (1998), Paper 573, 219-229.

Bohnet, Matthias, "Separating Immiscible Liquids," Chemical Engineering (1976), 48(3), 177-264.

Jordan, Jr., G.V., "Coalescence: Porous Materials," Chemical Engineering Progress (1965), 61(10), 64-71.

* cited by examiner

ACTIVE COALESCER TO REMOVE FINE LIQUID DROPLETS

BACKGROUND OF THE INVENTION

There are a variety of hydrocarbon conversion processes, and these processes utilize different catalysts.

Alkylation is typically used to react light olefins, for example mixtures of alkenes such as propylene and butylene, with isobutane to produce a relatively high-octane branched-chain paraffinic hydrocarbon fuel, including isoheptane and isooctane. Similarly, an alkylation reaction can be performed using an aromatic compound such as benzene in place of the isobutane. When using benzene, the product resulting from the alkylation reaction is an alkylbenzene (e.g. cumene, linear alkylbenzenes, etc.).

The alkylation of paraffins with olefins for the production of alkylate for gasoline can use a variety of catalysts. The choice of catalyst depends on the end product a producer desires. Typical alkylation catalysts include concentrated sulfuric acid or hydrofluoric acid. However, sulfuric acid and hydrofluoric acid are hazardous and corrosive, and their use in industrial processes requires a variety of environmental controls. Sulfuric acid alkylation requires an often expensive regeneration process.

There has been a move to replace the use of sulfuric acid and hydrofluoric acid with more environmentally friendly materials.

One material that has been studied is ionic liquid. Ionic liquids are essentially salts in a liquid state, and are described in U.S. Pat. Nos. 4,764,440, 5,104,840, and 5,824,832. The properties vary extensively for different ionic liquids, and the use of ionic liquids depends on the properties of a given ionic liquid. Depending on the organic cation of the ionic liquid and the anion, the ionic liquid can have very different properties. Ionic liquids provide advantages over other catalysts, including possibly posing less of an environmental threat than catalysts like HF, and being non-volatile.

Processes utilizing ionic liquids as catalysts in hydrocarbon conversion processes, such as alkylation, isomerization, disproportionation, reverse disproportionation, and oligomerization have been developed.

In biphasic ionic liquid processes, such as alkylation, small droplets of ionic liquid become dispersed in the continuous hydrocarbon phase. Because ionic liquids are typically fairly expensive, the ionic liquid catalysts need to be recovered. Some recovery of the droplets of ionic liquid can be accomplished by gravity settling due to the density difference between the ionic liquid and the hydrocarbon, or other separation processes.

However, fine droplets of ionic liquid are difficult to be separated by gravity, and some remain dispersed in the hydrocarbon phase after these separation processes. These small droplets are carried out with the hydrocarbon. In addition to requiring post-treatments to prevent droplets from fouling down-stream equipment, they are an economic loss.

One process designed to separate the fine droplets of ionic liquid from the hydrocarbon is described in U.S. Pat. No. 8,067,656. A coalescer material having a stronger affinity for the ionic liquid than the hydrocarbons is used. The coalescer material can be a high surface area material having a large amount of contact area to which the dispersed ionic liquids can adhere. However, these materials may be prone to plugging due to fine openings or channels in the coalescence medium.

Therefore, there remains a need for processes and devices for recovering the dispersed fine droplets of liquid.

SUMMARY OF THE INVENTION

One aspect of the present invention is a process for the separation of a first liquid from a continuous phase of a second liquid containing dispersed droplets of the first liquid. In one embodiment, the process includes introducing a stream of the continuous phase of the second liquid containing the dispersed droplets of the first liquid into a separation apparatus comprising a vessel containing at least one mesh screen covering substantially all of a cross-section of the vessel, the mesh screen made of wires. The mesh screen is periodically slightly rotated back and forth so that the wires of the mesh screen contact the dispersed droplets of the first liquid and at least a portion of the dispersed droplets of the first liquid coalesce on the wires. Coalesced droplets of the first liquid are formed on the wires, and the coalesced droplets are allowed to move from the wires through the stream of the second liquid. The coalesced droplets are collected in a portion of the vessel to form a layer of the first liquid and a stream of the continuous phase of the second liquid having a reduced level of dispersed droplets of the first liquid. The stream of the continuous phase of the second liquid having the reduced level of dispersed droplets of the first liquid is recovered. The layer of the first liquid can also be recovered, if desired.

Another aspect of the invention is a separation apparatus. In one embodiment, the separation apparatus includes a vessel having an inlet and at least two outlets; and at least one mesh screen covering substantially all of a cross-section of the vessel, the at least one mesh screen made of wires, the at least one mesh screen being movably mounted in the vessel.

DETAILED DESCRIPTION OF THE INVENTION

The present invention provides processes and separation apparatus for removing fine droplets of a first liquid dispersed in a second liquid, such as fine droplets of ionic liquid in a stream of a continuous phase of hydrocarbon using a mesh screen which moves slightly. In contrast to traditional coalescing media which are static, the moving mesh screen provides an active way to capture the fine dispersed droplets. The holes of the mesh screen are larger than typical coalescing media to avoid plugging. The periodic sweeping motion provides the same or an increased chance of capturing the dispersed droplets compared to typical coalescing media.

Figure 1A:
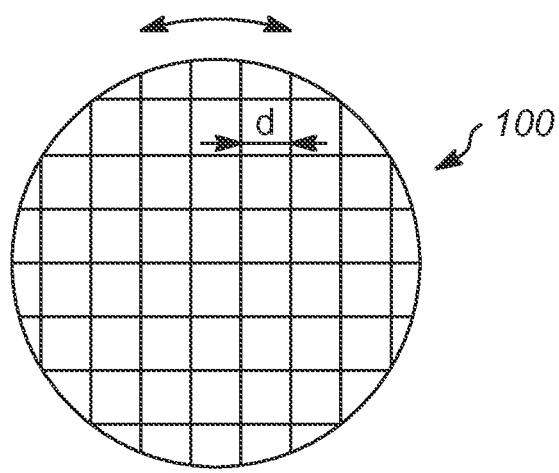
FIGS. 1A, 1B, and 1C illustrate three embodiments of a mesh screen which can be used in the present invention.
Figure 1B:
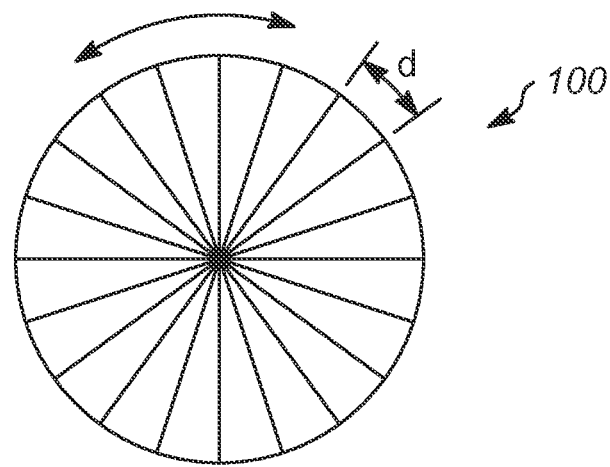
Figure 1C:
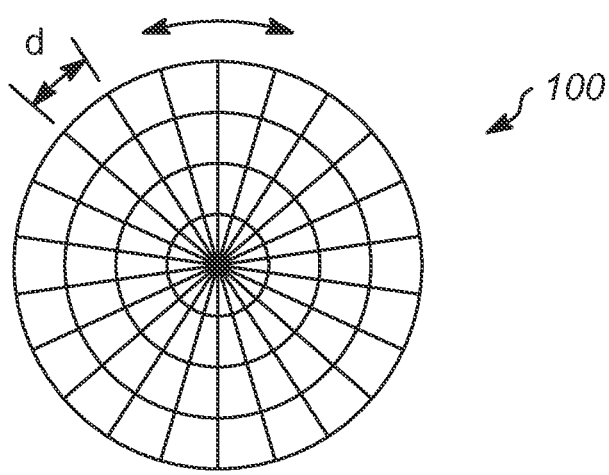

FIGS. 1A, 1B, and 1C illustrate several designs of the mesh screens 100. The separation apparatus includes at least one mesh screen 100 which covers substantially all of the cross-section of the vessel. By substantially all of the cross-section of the vessel, we mean that it covers at least about 90% of the cross section, or at least about 95%, or at least about 97%.

In the following discussion, the separation of fine ionic liquid droplets from a continuous hydrocarbon phase is used as an example to illustrate the process. In this case, the density of the dispersed ionic liquid droplets is greater than that of the continuous hydrocarbon phase.

Periodically, the mesh screen 100 moves slightly in the vessel. By moving slightly, we mean, moving the mesh screen a distance larger than the maximum spacing between the wires and less than about twice the maximum spacing between the wires in the direction of movement, e.g. typically between one and two times the spacing d between adjacent wires in the rotating direction to ensure the sweeping of the whole cross section of the vessel by the wires.

The openings in the mesh screen are relatively large to avoid or reduce plugging, e.g., the distance d between two adjacent wires of the mesh screen is typically in the range of about 0.25 cm to about 2.5 cm.

In some embodiments, the size of the openings varies depending on the location of the opening. For example, in the embodiments shown in FIGS. 1B and 1C, the distance d between adjacent wires at the outer edge of the mesh screen is greater than the distance d in the center part of the mesh screen.

The purpose of the movement is to increase the likelihood of contact between the fine droplets and the wires in the mesh screen as the liquid with the droplets flows through the mesh screen. In some embodiments, the movement is side to side, horizontally, vertically, or diagonally, for example. In other embodiments, the movement is rotational. In this case, the mesh screen rotates around the center axis slightly, e.g., less than about 10°, or less than about 7°, or less than about 5°, or less than about 4°, or less than about 3°, or less than about 2°.

For example, when the maximum spacing (d) on mesh screen as shown in FIG. 1C is 1.25 cm, and the radius of separation tank and the mesh screen is 1 m, then the rotation magnitude is between 0.72° and 1.43° for a radial wire to move a distance of 1 d and 2 d, respectively.

In another example, when a fine ionic liquid droplet flows with the continuous liquid in a velocity ($v_f$) of 0.0061 m/s through the mesh screen, and the thickness of the mesh wires is 0.25 mm, then the time for the fine ionic liquid droplet to pass through the mesh screen is about 0.041 s. In this case, the moving velocity at the outer edge of the mesh screen needs to be at least 0.30 m/s for a wire to sweep a distance of 1.25 cm so that the wire has a chance to contact with the passing droplet. The angular velocity of rotation of the mesh screen is about 0.3 l/s. Rotating the mesh screen back and forth slightly is better than continuous rotation of the mesh screen in one direction. It minimizes the disturbance created by the motion of the mesh screen and therefore minimizes the mixing of the separated first and second liquids. In addition, the design of motion frequency, wire thickness, and maximum spacing between wires can be optimized to minimize turbulence or disturbance that may hinder separation.

For vessels with rectangular or square cross section, the mesh screen can be designed with its length or width slightly smaller than that of the tank so that the screen can be moved side to side (horizontally, vertically, or diagonally) to cover the cross-section of the vessel fully.

Because the moving mesh screen covers substantially all of the cross-section of the vessel, theoretically all of the fine dispersed droplets will be captured by the wires of the mesh screen, even though the periodic movement is small.

When the fine droplets are captured on the wires of the mesh screen, the droplets coalesce into larger droplets which are easier to settle out of the second liquid. The layer of the first liquid can then be recovered and recycled to a conversion zone or other process zone where the first liquid is used.

After passing through the mesh screen, the stream of the continuous phase of the second liquid will have a lower level of the dispersed droplets of the first liquid than the incoming stream.

The hydrocarbon stream containing dispersed ionic liquid droplets generally contains less than 30-50% in volume, or less than 20% in volume, or less than 10% in volume, or less than 7% in volume, or less than 5% in volume, or less than 3% in volume, or less than 1% in volume, or less than 1000 ppm in volume of dispersed ionic liquid.

The dispersed ionic liquid droplets typically have a diameter of less than about 1000 µm, or less than about 750 µm, or less than about 500 µm, or less than about 250 µm, or less than about 100 µm, or less than about 75 µm, or less than about 50 µm, or less than about 45 µm, or less than about 40 µm, or less than about 35 µm, or less than about 30 µm.

In order to improve the efficiency of the separation, there are typically a series of mesh screens, for example, at least two mesh screens, or at least five mesh screens, or at least ten mesh screens, preferably installed on one shaft or support for rotating or moving. The mesh screens are generally about 0.5 cm to about 5 cm apart. The pattern and the orientation of the mesh screens in a series can be the same or different from each other. Employing a series of mesh screens increases the recovery of the small droplets.

The mesh screens can be made of materials which have a greater affinity for the liquid of the droplets than the continuous liquid phase, for example, materials having a greater affinity for the ionic liquid droplets than for the hydrocarbon continuous phase. Suitable materials for the mesh screens include, but are not limited to, metals, glass fibers, polymer fibers, or metals coated with polymers.

Because of the large size of the holes in the mesh screen, the wires can be made so that they have small bristles on them in order to capture the small droplets better without worrying about plugging the mesh screen.

Figure 2:
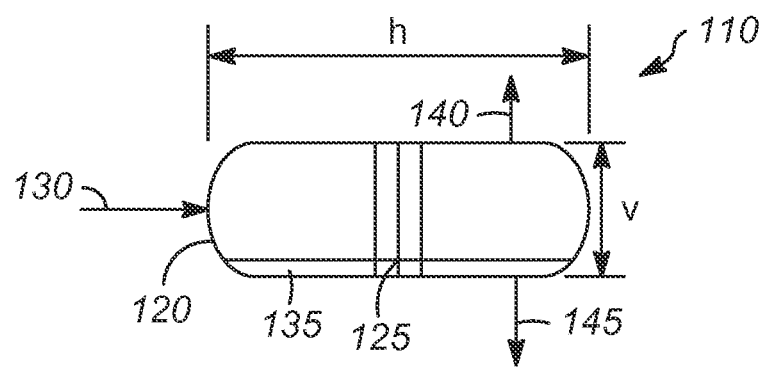
FIG. 2 illustrates one embodiment of a separation process of the present invention utilizing the mesh screen.

FIG. 2 illustrates one embodiment of a separation apparatus 110 including a vessel 120 employing three mesh screens 125. As will be understood, there could be fewer mesh screens or more mesh screens, as desired. A stream 130 of a continuous phase of a second liquid (for example, a hydrocarbon phase) containing dispersed droplets of a first liquid (for example, ionic liquid droplets) enters the vessel 120. The stream 130 flows through the mesh screens 125 which are perpendicular to the bulk liquid flow and periodically move back and forth slightly. There will be motors and associated controllers to actuate and control the movement of the mesh screens (not shown).

As the mesh screens 125 move, more droplets of the first liquid have the opportunity to contact the wires of the mesh screen 125 and coalesce on them. The coalesced droplets fall down to the bottom of the vessel 120 and form a layer 135 of the heavier first liquid.

In some embodiments, the dispersed droplets have a density less than that of the continuous phase. In that case, the lighter coalesced droplets would rise through the continuous phase to the top of the vessel, rather than fall to the bottom. The layer of coalesced droplets will form a layer on top of the second liquid.

After passing though the mesh screens 125, the continuous phase of the second liquid has less of the first liquid. Thus, the stream 140 of the continuous phase exiting the vessel 120 has fewer droplets of the first liquid than the incoming stream 130. The stream 140 can be sent to a process zone, or further treated (not shown), as desired.

The stream 145 contains the first liquid from the layer 135. The stream 145 can be further treated, such as by regenerating ionic liquid, and/or recycled to a process (not shown).

In this embodiment, the horizontal axis h of the vessel 120 is greater than the vertical axis v.

Figure 3A:
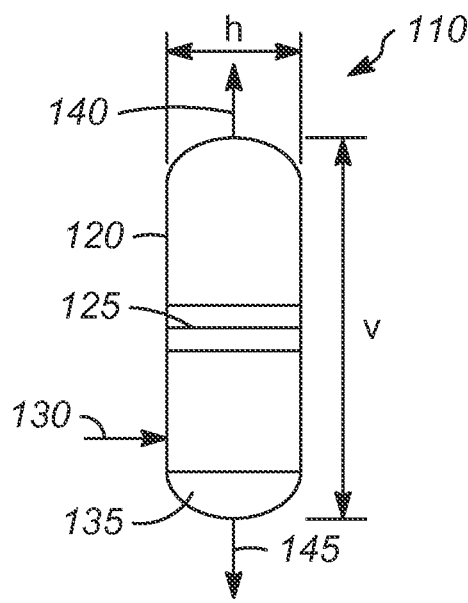
FIGS. 3A and 3B illustrate other embodiments of a separation process of the present invention utilizing the mesh screen.

FIG. 3A illustrates an embodiment in which the horizontal axis h is less than the vertical axis v. In this embodiment, the stream 130 enters near the bottom of the vessel 120, flows upward, and the stream 140 exits at (or near) the top, and the stream 145 exists at (or near) the bottom.

Figure 3B:
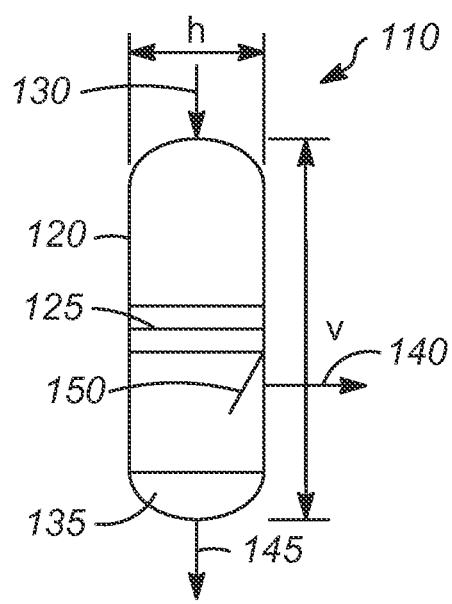

FIG. 3B illustrates another embodiment in which the horizontal axis h is less than the vertical axis v. In this embodiment, the stream 130 enters at (or near) the top of the vessel 120 and flows downward. The stream 140 exits at the side, and the stream 145 exists at (or near) the bottom. A baffle 150 can be used to reduce the potential entrainment of the droplets of the first liquid in the side draw of the second liquid.

The stream of the second liquid containing dispersed droplets of a first liquid can be a hydrocarbon stream with dispersed droplets of ionic liquid, or an aqueous system with dispersed droplets of organic solvent, for example. The hydrocarbon stream with the droplets of ionic liquid may come from a hydrocarbon conversion process, for example. Examples of processes that could generate hydrocarbon streams with dispersed ionic liquid droplets include, but are not limited to, alkylation, oligomerization, isomerization, disproportionation, and reverse disproportionation.

The hydrocarbon to be treated can be any hydrocarbon typically processed in the hydrocarbon conversion processes and will depend on the particular hydrocarbon conversion process involved. The hydrocarbon typically includes, but is not limited to, hydrocarbons containing 1 to 30 carbon atoms.

The ionic liquid can be any ionic liquid. There can be one or more ionic liquids. Suitable ionic liquids include, but are not limited to, nitrogen-containing cations and phosphorus-containing cations, such as phosphonium based ionic liquid, imidazolium based ionic liquid, ammonium based ionic liquid, lactamium based ionic liquid, pyridinium based ionic liquid, pyrrolidinium based ionic liquid, or combinations thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for the separation of a first liquid from a continuous phase of a second liquid containing dispersed droplets of the first liquid comprising:

introducing a stream of the continuous phase of the second liquid containing the dispersed droplets of the first liquid into a separation apparatus comprising a vessel containing at least one mesh screen covering substantially all of a cross-section of the vessel, the mesh screen made of wires;

periodically slightly moving the mesh screen a distance larger than the maximum spacing between the wires and less than about twice the maximum spacing between adjacent wires in the direction of movement so that the wires of the mesh screen contact the dispersed droplets of the first liquid and at least a portion of the dispersed droplets of the first liquid coalesce on the wires;

forming coalesced droplets of the first liquid on the wires;

allowing the coalesced droplets to move from the wires through the stream of the second liquid;

collecting the coalesced droplets in a portion of the vessel to form a layer of the first liquid and a stream of the continuous phase of the second liquid having a reduced level of dispersed droplets of the first liquid; and recovering the stream of the continuous phase of the second liquid having the reduced level of dispersed droplets of the first liquid.

2. The process of claim 1 further comprising recovering the layer of the first liquid.

3. The process of claim 1 wherein there are at least two mesh screens separated by less than 5.0 cm.

4. The process of claim 1 wherein the maximum distance between adjacent wires is in a range of about 0.25 cm to about 2.5 cm.

5. The process of claim 1 wherein a distance between adjacent wires at an outer edge of the at least one mesh screen is greater than a distance between adjacent wires in the middle of the at least one mesh screen.

6. The process of claim 1 wherein periodically slightly moving the at least one mesh screen comprises periodically rotating the mesh screen less than 10°.

7. The process of claim 1 wherein a horizontal axis of the vessel is greater than a vertical axis, and wherein the at least one mesh screen is perpendicular to a bulk flow of the stream of the continuous phase of the second liquid containing the dispersed droplets of the first liquid.

8. The process of claim 1 wherein a vertical axis of the vessel is greater than a horizontal axis, and wherein the mesh screen is perpendicular to a bulk flow of the stream of the continuous phase of the second liquid containing the dispersed droplets of the first liquid.

9. The process of claim 1 wherein the mesh screen moves at a frequency so that the dispersed droplets of the first liquid contact at least one wire when passing through the screen.

10. The process of claim 1 wherein the first liquid is an ionic liquid and the second liquid is a hydrocarbon.

11. The process of claim 10 wherein the ionic liquid comprises a phosphonium based ionic liquid, an imidazolium based ionic liquid, a pyridinium based ionic liquid, a trialkyl or tetraalkyl ammonium based ionic liquid, a pyrrolidinium based ionic liquid, a lactamium based ionic liquid, and combinations thereof.

12. The process of claim 1 wherein the dispersed droplets of the first liquid have a diameter of less than about 100 μm.

13. The process of claim 1 wherein the wires are made of a material having a stronger affinity for the first liquid than the second liquid.

14. A process for the separation of a first liquid from a continuous phase of a second liquid containing dispersed droplets of the first liquid comprising:

introducing a stream of the continuous phase of the second liquid containing the dispersed droplets of the first liquid into a separation apparatus comprising a vessel containing at least one mesh screen covering substantially all of a cross-section of the vessel, the mesh screen made of wires;

periodically slightly moving the at least one mesh screen from a first side of the vessel to a second side of the vessel a distance larger than the maximum spacing between the wires and less than about twice the maximum spacing between adjacent wires in the direction of movement so that the wires of the mesh screen contact the dispersed droplets of the first liquid and at least a portion of the dispersed droplets of the first liquid coalesce on the wires;

forming coalesced droplets of the first liquid on the wires;

allowing the coalesced droplets to move from the wires through the stream of the second liquid;

collecting the coalesced droplets in a portion of the vessel to form a layer of the first liquid and a stream of the continuous phase of the second liquid having a reduced level of dispersed droplets of the first liquid; and recovering the stream of the continuous phase of the second liquid having the reduced level of dispersed droplets of the first liquid.

15. The process of claim 14 further comprising recovering the layer of the first liquid.

16. The process of claim 14 wherein there are at least two mesh screens separated by less than 5.0 cm.

17. The process of claim 14 wherein the maximum distance between adjacent wires is in a range of about 0.25 cm to about 2.5 cm.

18. The process of claim 14 wherein a distance between adjacent wires at an outer edge of the at least one mesh screen is greater than a distance between adjacent wires in the middle of the at least one mesh screen.

19. The process of claim 14 wherein periodically slightly moving the at least one mesh screen comprises periodically rotating the mesh screen less than 10°.

20. The process of claim 14 wherein the dispersed droplets of the first liquid have a diameter of less than about 100 µm.

* * * * *